United States Patent [19]

Briggs

[11] 4,301,954
[45] Nov. 24, 1981

[54] SPARE TIRE CARRIER

[76] Inventor: Stanley E. Briggs, 200 Circle Dr., Beloit, Kans. 67420

[21] Appl. No.: 72,586

[22] Filed: Sep. 5, 1979

[51] Int. Cl.³ .............................................. B62D 43/00
[52] U.S. Cl. ............................... 224/42.23; 224/42.21; 414/465; 414/466
[58] Field of Search ............... 224/42.23, 42.06, 42.21, 224/42.26, 42.28, 42.3; 414/463, 465, 466

[56] References Cited

U.S. PATENT DOCUMENTS

| | | | |
|---|---|---|---|
| 2,399,207 | 4/1946 | Clark | 414/465 |
| 2,494,411 | 1/1950 | Simi | 414/465 |
| 2,574,465 | 11/1951 | Clark | 224/42.22 |
| 2,956,716 | 10/1960 | Goulet | 224/42.21 |
| 3,323,667 | 6/1967 | Hall | 214/454 |
| 3,330,431 | 7/1967 | Knecht | 214/454 |
| 3,398,846 | 8/1968 | Ragan et al. | 224/42.23 |
| 3,554,414 | 1/1971 | Woods | 297/42.05 |
| 3,648,867 | 3/1972 | Beavers | 414/466 |
| 3,698,609 | 10/1972 | Lund | 224/42.06 X |
| 3,869,075 | 3/1975 | Kissner | 224/42.06 |
| 3,883,018 | 5/1975 | Hoisington | 414/466 |
| 4,174,797 | 11/1979 | Yasue et al. | 224/42.23 X |

*Primary Examiner*—Steven M. Pollard
*Attorney, Agent, or Firm*—Fishburn, Gold and Litman

[57] ABSTRACT

A spare tire carrier for use on a motor vehicle. The carrier comprises a swing arm having a spare tire holding a basket attached thereto. The swing arm is pivotally connected to a frame of the motor vehicle by a hinge. The hinge is tilted rearwardly at the top thereof such that gravity urges the swing arm rearwardly. The carrier stows the spare tire under the rear of the pickup bed. A latching mechanism retains the carrier in a stowed position. Upon release of the latching mechanism, the carrier along with the spare tire rotates rearwardly about the hinge and downwardly to a position to the rear of the vehicle allowing the spare tire to be easily removed from the carrier for changing of a flat tire.

4 Claims, 7 Drawing Figures

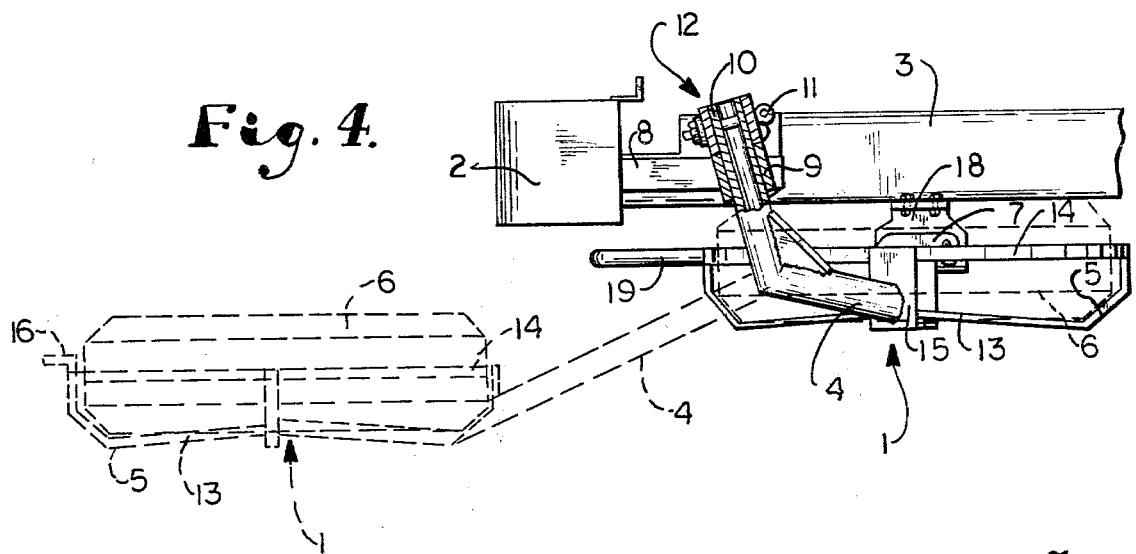
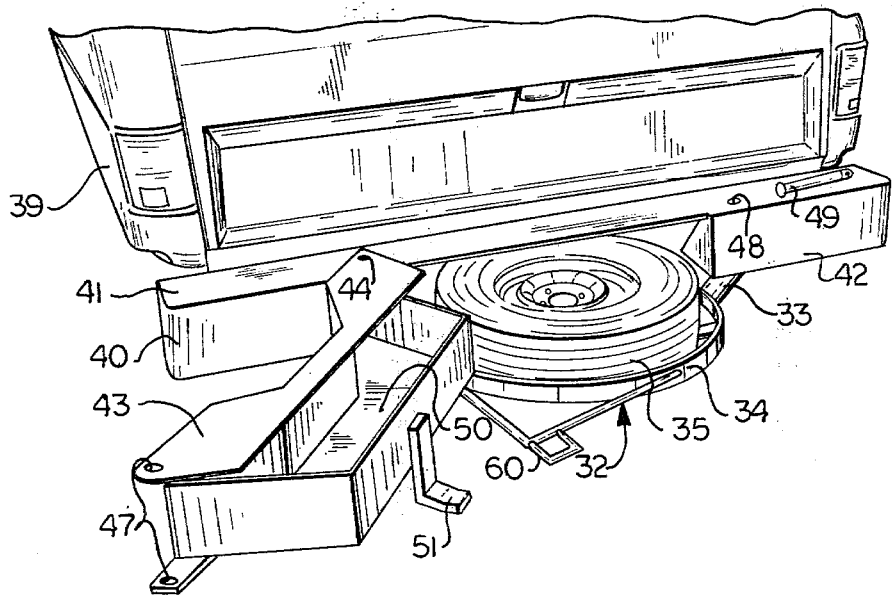

4,301,954

SPARE TIRE CARRIER

BACKGROUND OF THE INVENTION

The invention relates to spare tire carriers for motor vehicles and in particular to a spare tire carrier that conceals the spare tire in a stowed position under the bed of a truck when the spare tire is not needed and which allows the spare tire to rotate from under the truck bed such that the spare tire is readily accessible for the changing of a flat.

Owners of open motor vehicles such as pickup trucks have long been faced with a dilemma as to what to do with their spare tires. Usually the manufacturers have provided a place to store the spare tire either on the outside of the truck, such as on the side of the bed, or under the rear of the bed of the truck.

Stowing the spare tire by attaching it to an outside portion of the truck exposes the spare tire to pilfery and to vandalism.

Stowing the spare tire under the bed of the truck also has drawbacks. In particular, it is physically difficult to remove the spare tire from the stowed position, removal often includes laying on one's back to disengage the spare tire and then pull the tire from beneath the truck, which is especially troublesome in nonideal physical surrounding, such as snow or rain.

OBJECTS OF THE INVENTION

Therefore, the principal objects of the present invention are: to provide a spare tire carrier for a motor vehicle that stows the spare tire in a concealed or stowed position under the bed of the truck; to provide such a carrier which places the spare tire in an easily accessible position when the tire is needed for replacing a flat tire; to provide such a carrier which utilizes a rearwardly slanted hinge in conjunction with gravity to move the spare tire from the stowed position beneath the truck bed to the easily accessible position to the rear of the truck; to provide such a carrier including a latching mechanism to maintain the spare tire in the stowed position until needed; to provide such a carrier which is simple in design, easy to manufacture, capable of an extended useful life, and particularly well adapted for the proposed use thereof.

Other objects and advantages of this invention will become apparent from the following description taken in connection with the accompanying drawings wherein are set forth, by way of illustration and example, certain embodiments of this invention.

SUMMARY OF THE INVENTION

A spare tire carrier for use on a truck or the like comprising a swing arm having a spare tire carrying holding means or basket attached to one end thereof and an opposite end thereof pivotally connected to the truck by a pivot hinge. The hinge has an axis which is tilted rearwardly from vertical at the top thereof and allows the swing arm with the basket and spare tire to pivot or rotate, under the urging or biasing of gravity, when not restrained, from a stowed position beneath the rear of the truck to an exposed position extending rearwardly of the truck. Latching means selectively restrains the carrier in the stowed position. In a first embodiment the latching means comprises a latch member or hook which engages a tab on the basket to lock same in the stowed position. The latch member is manually released by movement of a release rod which pivots the latch member and disengages same from the tab. A ramp supports the tab and thus the carrier when in the stowed position. In a second embodiment the latching means comprises a bumper having a pivotal section which blocks the carrier in the stowed position when rotated into alignment with the remainder of the bumper and locked in that position. The bumper includes a bracket to help support the carrier when in the stowed position.

The drawings constitute a part of this specification and include exemplary embodiments of the present invention and illustrate various objects and features thereof.

BRIEF DESCRIPTION OF DRAWINGS

FIG. 4 is an enlarged side elevational view of the carrier showing a tilted hinge assembly thereof in detail.

FIG. 5 is a perspective view of an alternate embodiment of a spare tire carrier on a truck having a fold out bumper with a spare tire in a partially exposed position.

FIG. 6 is a rear elevational view of the alternate embodiment of the carrier of FIG. 5 with the spare tire in a stowed position.

FIG. 7 is a partial front elevational view of the alternative embodiment of the carrier of FIG. 5 with portions thereof broken away to show detail.

DETAILED DESCRIPTION OF THE PREFERRED EMBODIMENT

Figure 1:
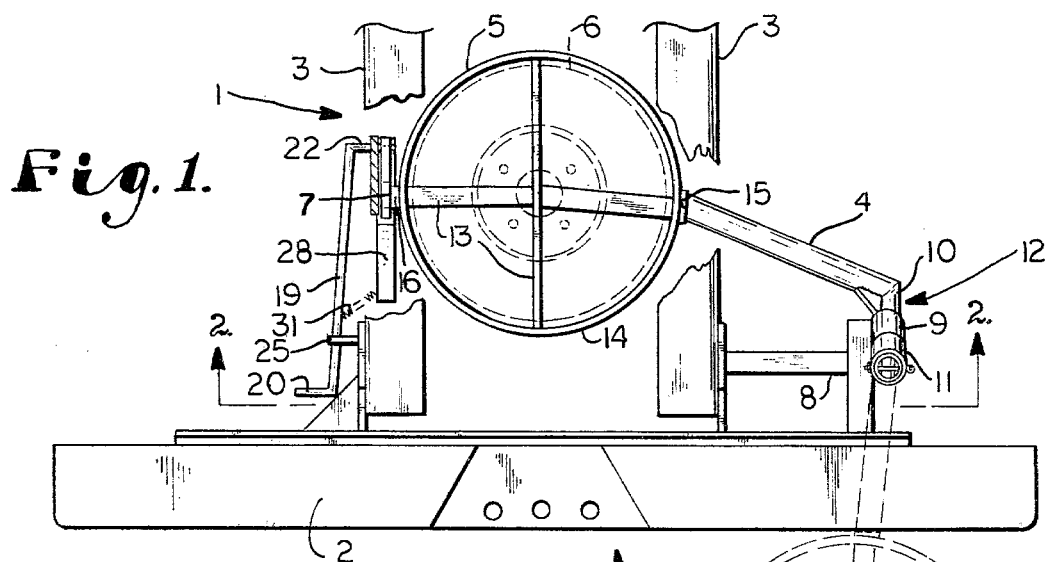
FIG. 1 is a top plan view showing a spare tire carrier on a truck in a stowed position with portions broken away to show detail thereof and the carrier (in phantom) in an exposed position behind the truck.
Figure 2:
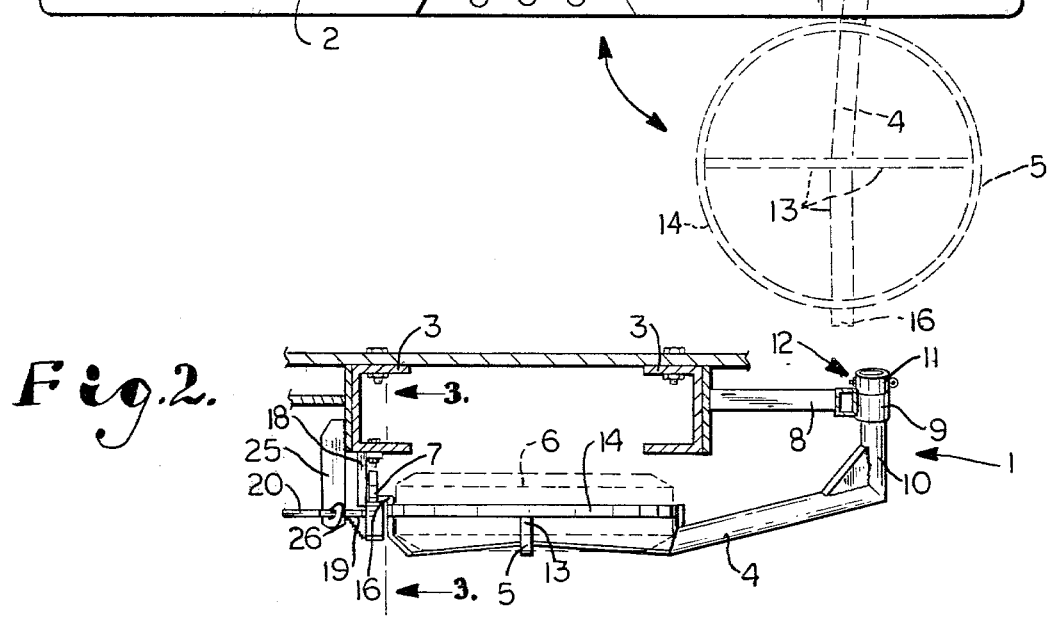
FIG. 2 is a cross sectional view of the carrier taken along line 2—2 of FIG. 1.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the embodiment shown in FIGS. 1 through 4 of the drawings:

As used herein the terms "rear", "front", "up", "down", "horizontal", "vertical" and various derivatives thereof have the same meaning as described in FIGS. 1 through 4.

The reference numeral 1 generally designates a spare tire carrier for a pickup truck or other similar motor vehicle having a bumper 2 and a pair of laterally spaced chassis or frame members 3. The carrier 1 comprises a swing arm 3, the swing arm being pivotally connected to one of the truck frame members 3 holding means or a basket 5 in which to place a spare tire 6, and a latching mechanism 7 used to latch the spare tire carrier 1 in a stowed position wherein the spare tire 6 is beneath the truck, as is illustrated by the carrier 1 in solid lines in FIG. 1. The spare tire carrier 1 also has an accessible position wherein the spare tire 6 is rearward of the truck bumper 2, so that the tire 5 can be easily removed from the carrier 1, as is illustrated by the carrier 1 shown in phantom in FIG. 1. A T-shaped support member 8 is securely attached to one of the frame members 3 so as to extend horizontally and outwardly therefrom. A sleeve 9 is secured to the support member 8 and is angled with respect to vertical such that the top 1 is rearward of the bottom thereof, preferably at an angle in the nature of 15° with respect to vertical. A rod or shaft 10 coaxial with the sleeve 9 is a first portion of the swing arm 4 and is rotatably held at an upper end thereof in the sleeve 9 by restraining means or a pin 11 extending through and outwardly from the shaft 10 above the sleeve 9. The shaft 10 and sleeve 9 comprises a pivotal hinge 12 about which the swing arm 4 rotates. The axis of the hinge 12 is thus tilted rearwardly at the top thereof and is in a generally vertical traverse plane, such that the swing arm 4 is continuously urged by gravity to rotate into this vertical plane whereby the spare tire 6 and carrier 1 are in the exposed position thereof behind the truck. The swing arm 4 except for the shaft 10 is generally horizontal when in the stowed position and slants generally downwardly and rearwardly from the hinge 12 when in the exposed position.

Attached near the end of swing arm 4 opposite the hinge 12 are straps 13 that extend radially from the swing arm 4 and are shaped in such a fashion as to conform to a sidewall of the spare tire 6. A ring 14 having a radius slightly greater than the spare tire 4 is securely attached to each end of the straps 13 opposite the attachment thereof to the swing arm 4. A vertical tab 15 also interconnects the swing arm 4 and ring 14. The ring 14 and straps 13 comprise the holding means or basket 5 which is thus shaped such that the spare tire 6 will fit therein. A horizontal tab 16 is located on and extends radially outwardly from the ring 14 diagonally opposite the interconnection of the ring 14 with the swing arm 4 via the tab 15. The tab 16 is used in conjunction with latching mechanism 7 for securely stowing the spare tire carrier 1.

The latching mechanism 7 comprises a support bracket 18, a release rod 19 with a handle 20 attached thereto at its rearmost end, and a front end 22 and a latch member 24 pivotally connected to the release rod front end 22.

Figure 3:
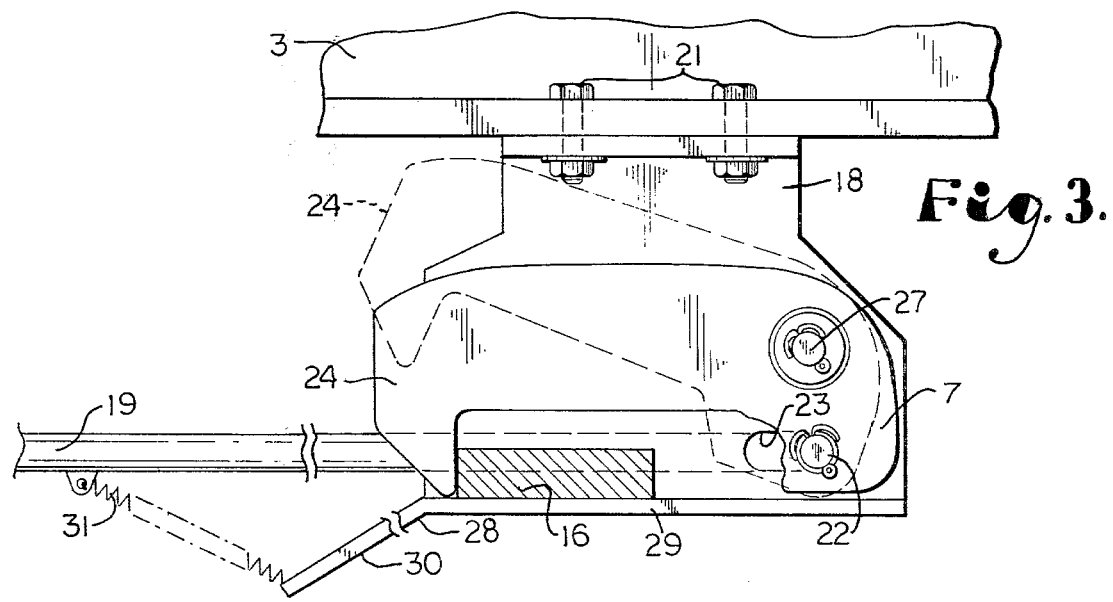
FIG. 3 is a cross-sectional view of the carrier taken along line 3—3 of FIG. 1, showing a latching assembly thereof in detail.

The support bracket 18, as is best seen in FIG. 3, is secured to one of the frame members 3 by bolts 21 or the like and is spaced from the hinge 12 by approximately the distance separating the hinge 12 and the tab 16. The support bracket 18 extends downwardly from the truck frame member 3 and has a lower aperture or horizontally aligned slot 23 through which the release rod front end 22 extends. The front end 22 of the release rod 19 is at a substantial angle to the main shaft of the release rod 19 and generally perpendicular to the support bracket 18. The release rod front end 22 also extends through an aperture (not shown) in a lower front portion of the latch member 24 and is held in place by a cotter pin or the like. The release rod 19 is also supported by a vertical bracket 25 attached to the frame member 3 having an aperture 26 through which the release rod 19 extends. The latch member 24 is illustrated as a hook and is also pivotally connected to the support bracket 18 by a pivot pin 27 extending through apertures in both the support bracket 18 and latch member 24 (not shown) and secured therein by cotter pins or the like. The slot 23 has sufficient play therein with reference to the release rod front end 22 to allow the latch member 24 to pivot upwardly at the rear end thereof upon the pivot pin 27. The latch member 24 engages and holds the tab 16, as shown in FIG. 3, whenever the tire carrier 1 is in the stowed position.

A ramp 28 having a generally horizontal front section 29 and a downwardly and rearwardly sloping rear section 30 is fixedly secured to the bottom of the support bracket 18. The ramp 28 is adapted for guiding the tab 16 upward into a position for engagement with the latch member 24. An extension spring 31 interconnects the release rod 19 and the ramp 28 thereby urging the release rod 19 frontwardly with respect to the support bracket 18.

In use the spare tire carrier 1 functions to transport a spare tire 16 from a stowed position to an exposed position behind the vehicle such that changing of a flat tire is facilitated. In particular a spare tire 6 is placed in the tire carrier basket 5 while same is in an exposed position, as shown in phantom in FIG. 1. The swing arm 4 with attached clockwise, basket 5 and the spare tire 6 is rotated as seen in FIG. 1, about the hinge 12 until the tab 16 engages the ramp rear section 30. With further rotation the tab 16 rides up the ramp rear section 30 and slides under the latch member 24 which is continuously urged downward against the ramp front section 29 by the spring 31. The tab 16 is thus securely held by the latch member 24 and the tire carrier 1 is thus in the stowed position with the spare tire 6 beneath the truck.

To expose the spare tire 6 the handle 20 of the release rod 19 is manually drawn rearwardly. This counteracts the pull of the spring 31 and causes the rear of the latch member 24 to raise thereby releasing the tab 16. The angle of the axis of the hinge 12 allows gravity to then urge or bias the tire carrier 1 rearwardly and downwardly such that the swing arm rotates counterclockwise, as seen in FIG. 1, about the hinge 12. A slight pull may be required to move the tab 16 from the ramp front section 29 to the slanted ramp rear section 30. Without further manual effort the basket 5 and the spare tire 6 swing rearwardly of the truck, thus moving into the exposed position, whereby the spare tire 6 can easily be removed from the basket 5. When the handle 20 is released the spring 31 urges the latch member 24 to lower the rear portion thereof and again be ready to engage and hold the tab 16.

In the embodiment illustrated in FIGS. 5 through 7 the numeral 32 generally designates an alternative spare tire carrier. The carrier 32 comprises a swing arm 3 having a basket 34 holding a spare tire 35 and connected to a truck frame member 36 by an angled hinge 37 in essentially the same manner and with essentially the same function as swing arm 4, basket 5, spare tire 6, frame member 3 and hinge 12 respectively of the previous embodiment. The carrier 32 is illustrated on a truck 39 in FIGS. 5 and 6.

In the present embodiment the latching means comprises a bumper 40 having end sections 41 and 42 secured to the truck and a middle section 43. The bumper middle section 43 is pivotally connected at one end thereof to the end section 41 by a pivot arm 44. The other end of the middle section 43 and the other end section 42 each have pin receiving apertures 47 and 48 respectively into which a removable locking pin is received when the sections 41, 42 and 43 are all aligned, as shown in FIG. 6. The bumper middle section 43 includes a storage receptacle 50. An L-shaped bracket 51 is attached to the front lower portion of the bumper middle section 43 and is positioned to support the bracket 4 when the spare tire carrier 34 is in a stowed position and the bumper middle section 43 is aligned with the end sections 41 and 42. In addition a tab 53 and a ramp 54 similar to tab 16 and ramp 28 respectively of the previous embodiment are also utilized to support the tire carrier 32. A handle 60 extending rearwardly of the basket 34 is positioned so as to assist the user in pushing the basket 34 into a stowed position or initiating movement thereof into the exposed position. It is foreseen that a device such as an overcenter spring (not shown) could be included in the carrier 32 to aid in returning the basket 34 to the stowed position without interferring with the action of the hinge 37 in initiating movement of the basket 34 to the exposed position.

The embodiment of FIGS. 5 through 7 is used in the following manner: the spare tire 35 is placed in the basket 34 and manually rotated about the hinge 37 clockwise, as seen in FIG. 5, until the spare tire 35 and basket 34 is entirely in front of the bumper 40 and the tab 53 rests on the ramp 54. At this time the bumper middle section 43 is rotated upon the pivot pin 44 until same aligns with the end sections 41 and 42. Thereafter the pin 49 is placed in the receiving apertures 47 and 48 and secured therein, thereby locking the bumper section 41, 42 and 43 in an aligned position and placing the spare tire carrier 32 along with the spare tire 35 in the stowed position with the bracket 51 supporting the basket 34.

To place the spare tire in an exposed position the pivot pin 49 is removed and the bumper middle section 43 is rotated clockwise, as seen in FIG. 5, about the pivot pin 49. The angle of the hinge 37, substantially without further manual effort, allows gravity to urge the swing arm 33 with attached basket 34 and the spare tire 35 to rotate counterclockwise about the hinge 37 so as to transfer the spare tire 35 rearwardly and downwardly, thus placing the spare tire 36 behind the truck 39 and in an accessible position for easy removable from the basket 34.

It is to be understood that while certain embodiments of the present invention have been illustrated and described herein, it is not to be limited to the specific forms or arrangement of parts described and shown.

What is claimed and desired to secure by Letters Patent is:

1. A spare tire carrier for use on a truck having laterally spaced frame members, said carrier comprising:
   (a) a swing arm;
   (b) a pivot hinge mounted on said swing arm and adapted for securing to one of said frame members in a location to permit said swing arm to pivot from a stowed position beneath the rear of said truck to an exposed position extending rearwardly of said truck;
   (c) said pivot hinge having a pivot axis tilted rearwardly from vertical at the top thereof and thereby biasing said swing arm for movement downwardly and rearwardly from said stowed position to said exposed position;
   (d) latching means for selectively holding said swing arm in said stowed position, and;
   (e) holding means on said swing arm for securing a spare tire thereto such that said spare tire will pass from a stowed position to an exposed position with said swing arm; and wherein:
   (f) said holding means is attached to said swing arm at an end opposite said pivot hinge and includes a basket; said basket comprising a circumferential ring adapted for encircling the spare tire to be stowed and a plurality of straps; each of said straps being securely attached at one end thereof to a generally common location on said swing arm and radially extending outwardly from said common location to said ring; each of said straps being of a shape to conform to a sidewall of the spare tire positioned horizontally within said basket; said basket securely holding the spare tire until the spare tire is manually removed therefrom.

2. The tire carrier according to claim 1 wherein:
   (a) said basket includes a tab extending outwardly from said ring on a side of said basket opposite said pivot hinge; and wherein
   (b) said latching means comprises a latch member pivotally connected to a second frame member of the truck and adapted for engaging and holding said tab when said swing arm is in a stowed position.

3. The tire carrier according to claim 2 including:
   (a) a support ramp fixedly connected to said second frame member of the truck and positioned so as to receive and support said tab when said carrier is in the stowed position.

4. The tire carrier according to claim 2 wherein:
   (a) said latching means includes a release rod extending to the rear of the truck; said release rod being connected to said latch member, such that when said release rod is manually moved, said hook is pivotally rotated and thereby disengage from and releases said tab allowing said swing arm to move from the stowed position to the exposed position.

* * * * *